United States Patent Office 2,736,779
Patented Feb. 28, 1956

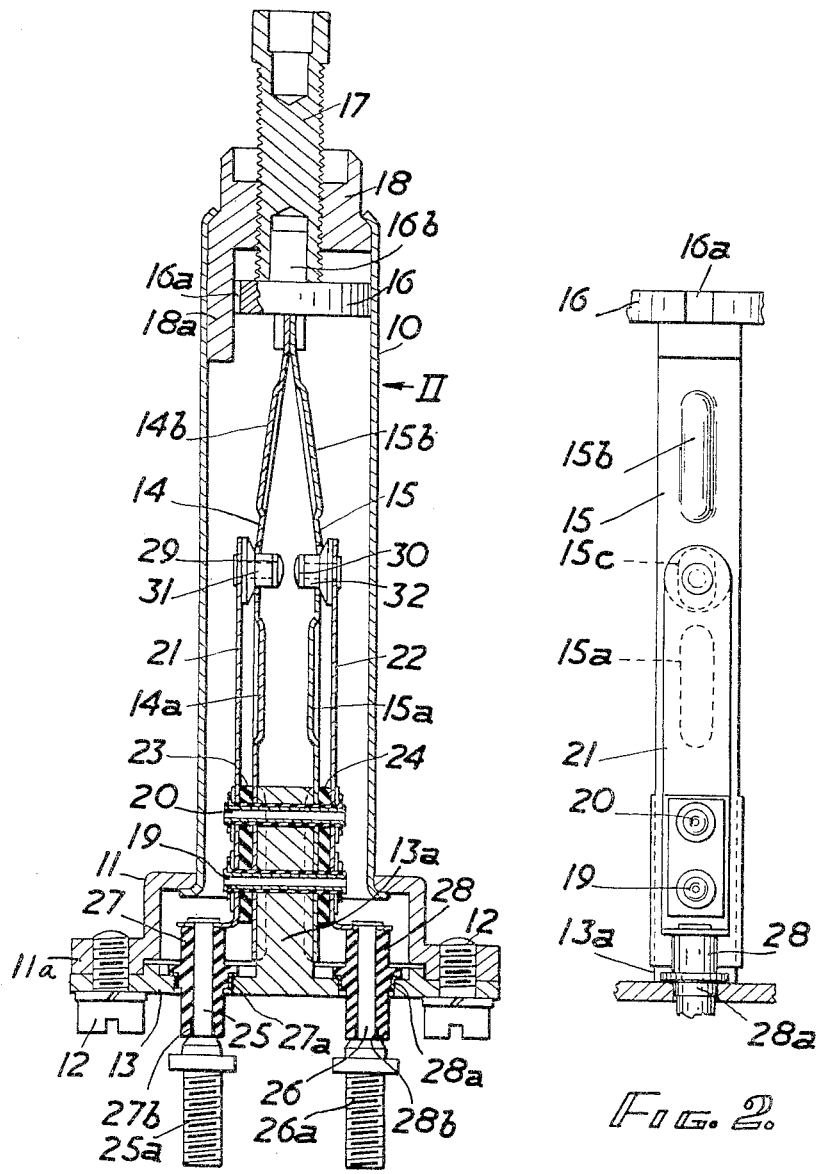

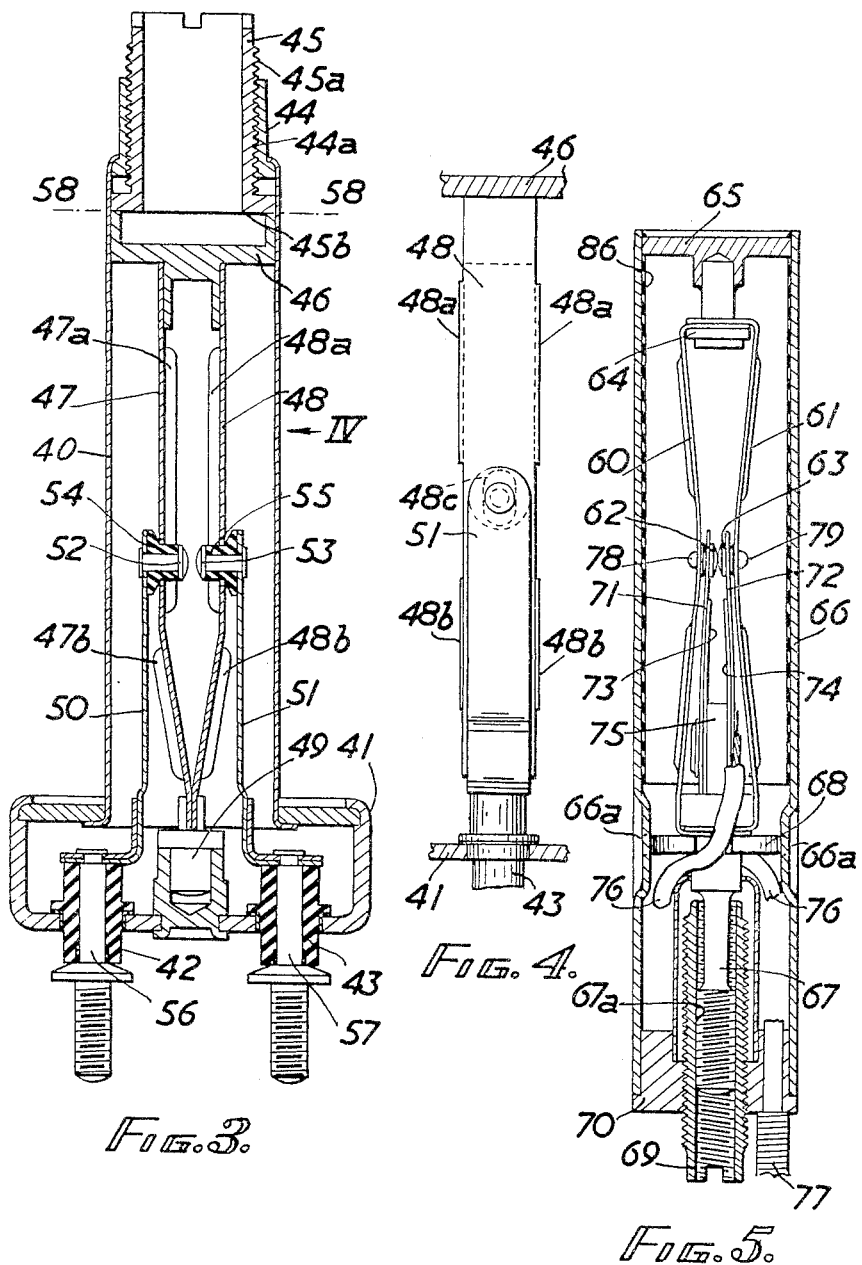

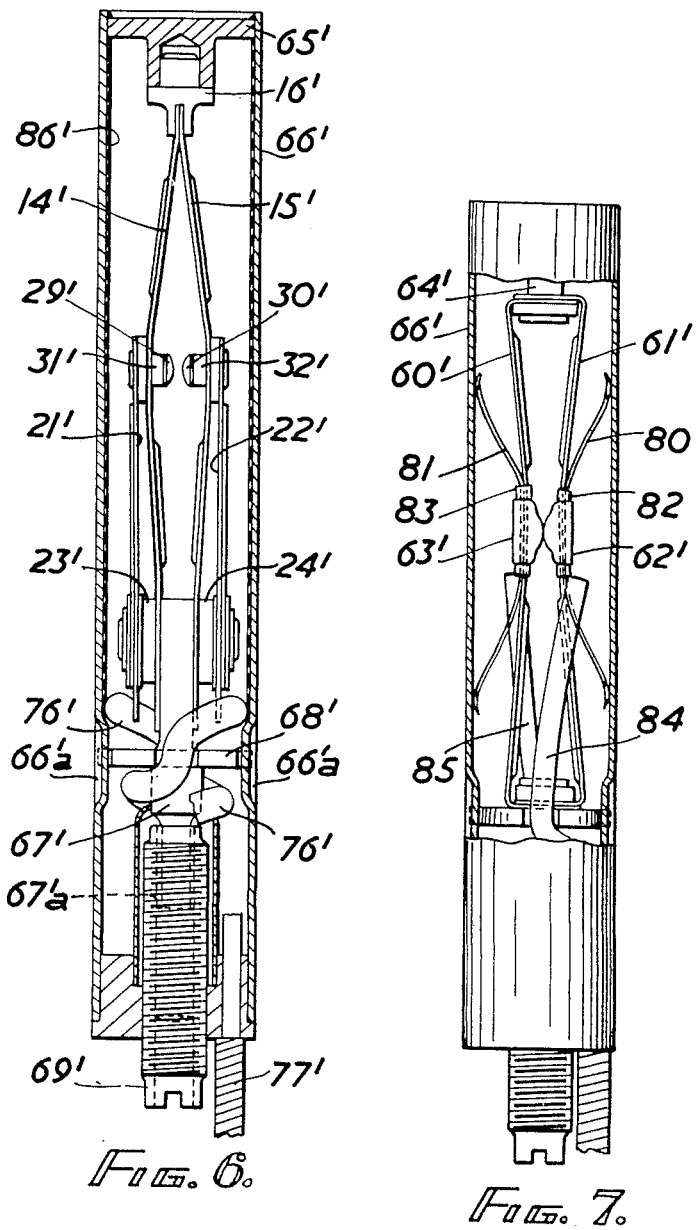

2,736,779

TEMPERATURE RESPONSIVE DEVICES

Anders Mathisen and Rupert Griffiths, London, England, assignors of one-half to Graviner Manufacturing Company Limited, London, England, a British company, and one-half to The Wilkinson Sword Company Limited, London, England, a British company Application January 25, 1954, Serial No. 405,908

Claims priority, application Great Britain January 30, 1953

10 Claims. (Cl. 200—137)

This invention relates to temperature detectors.

Although the invention is applicable to temperature detectors in general it is particularly applicable to temperature detectors for use in aircraft. Such detectors are commonly used in aircraft engine bays in order to indicate the existence of an excessive temperature, due for example, to a fire in the bay.

One form of temperature detector which is commonly used in aircraft operates on a differential thermal expansion principle and comprises a barrel of a metal having a high coefficient of thermal expansion in which is housed a spring bow assembly of a metal having a low coefficient of thermal expansion. The spring bow assembly comprises two bow springs whose ends are united and whose centres are bowed outwardly from one another, an electrical contact being mounted centrally on each bow spring. One end of the spring bow assembly is attached to the base of the detector to which one end of the barrel is also attached. The other end of the spring bow assembly is provided with a screw thread which engages a screw-threaded member secured to the free end of the barrel.

Under normal conditions the spring bow assembly is compressed by the barrel so that the centre portions of the bow springs are bowed outwardly from one another and thus the two electrical contacts are separated. The degree of compression can be varied by adjusting the threaded engagement between the spring bow assembly and the free end of the barrel.

When the detector is subjected to an elevated temperature the expansion of the barrel is greater than that of the spring bow assembly and the spring bows are no longer compressed to the same extent but are free to move towards one another due to their inherent resilience, thereby closing the electrical contacts. Thus, by adjustment of the degree of compression applied to the spring bow assembly by the barrel at room temperature, it is possible to alter the elevated temperature at which closure of the electrical contacts occurs. The electrical contacts are normally arranged to operate an indicator, such as an electric lamp, in the pilot's cockpit to give an indication that the elevated temperature condition exists.

Such temperature detectors have proved very successful in use but with the development of more powerful engines, and in particular with the development of jet propulsion units, the possible permissible rates of rise of temperature in power plants has increased considerably. Under such conditions the existing temperature detectors are not always satisfactory. If the detector is submitted to a very rapid increase in temperature, for example due to the fact that it is mounted close to the combustion chambers of a jet propulsion unit, the barrel will be heated considerably before the heat has penetrated to the spring bow assembly so that there will be rapid expansion of the barrel and little or no expansion of the spring bow assembly. As a result the electrical contacts may be closed even though the actual temperature is less than that at which the switch is set to operate and the pilot will be under the impression that an excessive temperature condition is present. In a short time, however, the heat will penetrate to the spring bow assembly which will in turn expand, albeit to a more limited extent due to its lower coefficient of thermal expansion, and, assuming that the temperature is lower than that at which the switch is set to operate, this expansion will result in the contacts reverting to the open condition. As a result the fire warning given to the pilot will be cancelled. Such false fire warnings upon aircraft are extremely undesirable as, on the one hand, they may cause the pilot to mistrust the detector and thereby fail to take appropriate action when a fire or other elevated temperature condition actually exists, or, on the other hand, they may cause him to take the action appropriate to the existence of a fire or like condition when, in fact, no such condition exists.

The difficulty experienced with very rapid rises of temperature would not, of course, arise if it were possible to use a material for the spring bow assembly which had a substantially zero coefficient of thermal expansion over the necessary temperature range, and which, at the same time, had the necessary resilient properties over the temperature range to give firm and positive opening and closing of the contacts. However, at the present time it appears that no such material is commercially available.

The applicants have found a novel solution of the problem and according to the present invention there is provided a thermal detector comprising a first member having a substantial coefficient of thermal expansion over a predetermined temperature range, a second member having a small or negligible coefficient of thermal expansion over said range, said second member being mounted relative to said first member at two spaced points in such a manner that said second member is flexed at low temperatures in said range, said second member having a short intermediate portion whose resistance to bending is lower than that of the main portion of said member whereby substantially the whole of the flexing of said second member is localised at said intermediate porton, and resilient means tending to urge said second member into a predetermined position, the arrangement being such that when said first member is raised to a predetermined elevated temperature in said range the differential expansion between said first and second members varies the flexure of said second member.

The invention also provides a thermal detector comprising an elongated member having a substantial coefficient of thermal expansion over a predetermined temperature range, a second elongated member mounted relative to two spaced points on said first member whose distance apart is such that said second member is flexed at least at temperatures below a predetermined elevated temperature in said range, said second member being of a material of low or negligible coefficient of thermal expansion over said temperature range and being so formed that flexing is localised at an intermediate portion of said second member, and one or more resilient elements adapted to vary the flexure of said second member, differential expansion between said first and second members aiding or opposing said resilient elements and causing movement of said second member into a predetermined position to effect a desired operation at said predetermined elevated temperature.

The invention further provides a thermal detector comprising a first member having a substantial coefficient of thermal expansion over a predetermined temperature range, a second member having a small or negligible coefficient of thermal expansion over said range, said second member being in the form of two relatively rigid strut portions united by a short flexible portion and with the other end of each strut portion fixed relative to said first member so that said second member is fixed at least at temperatures below a predetermined elevated temperature in said range, and means urging said second member into a less flexed position, whereby at a predetermined elevated temperature in said range the differential expansion between said first and second members enables said second member to attain said position.

Four constructions of temperature detectors according to the present invention will now be described, by way of example only, with reference to the accompanying drawings in which:

Fig. 1 is a sectional side elevation of one construction of detector,

Fig. 2 is a fragmentary view in the direction of the arrow II in Fig. 1 showing the arrangement of the flexible members and cooperating resilient means with the housing removed, Fig. 3 is a sectional side elevation of a second construction of detector, and Fig. 4 is a fragmentary view in the direction of the arrow IV in Fig. 3, similar to Fig. 2, whilst Figs. 5 to 7 are sectional side elevations of three further forms of detector particularly designed for industrial use.

Referring firstly to Figs. 1 and 2, in the first construction there is provided an alloy steel barrel 10 having a high coefficient of thermal expansion, which is welded at one end in a flanged collar 11, the flange portion 11a of which is secured by screws 12 to a circular base 13. Mounted within the barrel 10 is an assembly comprising two relatively rigid strut members 14, 15 of a material having a low coefficient of thermal expansion, which are secured at one end to a rectangular projection 13a of the base 13 and are united at the other end in an adjustable carrier 16. A stud 16b of the adjustable carrier 16 is a sliding fit in one end of a threaded stud 17 which is in threaded engagement with a plug 18 secured in the end of the barrel 10, whereby as the stud 17 is turned in the appropriate direction it moves the adjustable carrier 16 towards the base 13. The adjustable carrier 16 is prevented from rotating by engagement of a slot 16a in a finger 18a extending from the plug 18. The strut members 14, 15 are secured to the projection 13a by rivets 19, 20 which also secure in position cantilever springs 21, 22 two insulating spacing pieces 23, 24 being provided to space each spring 21, 22 from its associated strut member 14, 15 and also to insulate each spring 21, 22 from the remainder of the structure. One end of each spring 21, 22 is formed into a connecting strip and is secured to pins 25, 26 respectively which are each sealed in a ceramic bush 27, 28 the ends 25a and 26a of the pins forming terminal screws. The ceramic bushes 27, 28 are metallised at 27a, 28a so that they can be brazed into the base 13 and are also metallised at 27b, 28b so that the pins 25, 26 can be brazed therein. The springs 21, 22 are each provided at their free end with a contact 29, 30 the stems of which are enclosed in a ceramic bush 31, 32 and the springs 21, 22 are so pre-set that the ceramic bushes 31, 32 bear on the strut members 14, 15 and tend to urge the latter together and bring the contacts 29, 30 into engagement.

Each of the members 14, 15 comprises two relatively rigid straight portions united by a short flexible portion. In this construction the rigid portions are made relatively rigid by pressing-out longitudinal webs 14a, 14b and 15a, 15b. Apertures 14c, 15c are provided at the flexible joint between the two relatively rigid portions, and these serve the dual purpose of providing an aperture through which the ceramic bush 31, 32 respectively passes and of increasing the flexibility of the members 14, 15 at the flexible joint.

In operation, the setting of the carrier 16 at normal room temperature is such that the struts 14, 15 are flexed at the flexible joint to such an extent that the contacts 29, 30 are separated. If the temperature increases to a predetermined temperature at which an indication is required the differential expansion between the barrel and the struts is such that the struts 14, 15 are flexed towards one another under the pressure of the springs 21, 22 until the contacts 29, 30 finally engage at the predetermined temperature.

It will be appreciated that the apertures 14c, 15c are sufficiently elongated to permit expansion of the springs 21, 22 without such expansion affecting the struts 14, 15 so that the material of the springs 21, 22 may be chosen solely with a view to its resilient properties at elevated temperatures and without regard to its coefficient of thermal expansion. On the other hand, the struts 14, 15 can be of a material chosen solely for its property of low coefficient of thermal expansion and without regard to its resilient properties at elevated temperatures.

As stated above, no material is known to be available commercially which combines the properties of very low coefficient of thermal expansion with suitable resilience over a wide temperature range, and by the combination, according to the present invention, the above mentioned difficulties met with in existing detectors may be at least partially overcome.

Referring now to Figures 3 and 4, the second construction of detector shown in these figures is similar in principle to the first construction but differs in detail.

This construction is designed to provide a housing sealed against the ingress of dirt and moisture, and comprises a barrel 40 welded to an end casing 41 in which is sealed terminal bushes 42, 43 of similar construction to those shown in Figure 1. A sleeve 44 is secured in the other end of the barrel 40 and a hollow cylinder 45 provided with an external screw thread 45a engages with an internal screw thread 44a on the hollow sleeve 44. The annular face 45b of the cylinder 45 engages with a movable carrier 46.

The two strut members 47, 48 in this construction comprise, as before, two relatively rigid portions which are rendered rigid by turned-up side flanges 47a, 47b and 48a, 48b and one end of each strut is welded to the carrier 46, the other ends of the struts 47, 48 being united in a spigot 49 slidable in the end casing 41. The two springs 50, 51 are provided at their free ends with contacts 52, 53 secured in ceramic bushes 54, 55 as before, the springs 50, 51 being turned up at their free ends and rivetted to the lead-in screws 56, 57. The bushes 54, 55 pass through apertures 47c, 48c respectively in the struts.

The detector is adjusted in the factory prior to despatch by turning of the cylinder 45 which causes axial movement of the carrier 46 to vary the degree of flexure of the struts 47, 48. When the correct setting is attained the carrier 46 is secured relative to the barrel 40, for example by spot welding, and the sleeve 44, cylinder 45 and associated end portion of the barrel 40 are parted-off at the chain-dotted line 58—58. Subsequently the carrier 46 is completely welded to the barrel 40 to ensure satisfactory sealing.

As with the Fig. 1 construction overshoot of the operating temperature is allowed for by sliding of the spigot 49, but in this case the holes in the struts 47, 48, through which the bushes 54, 55, pass, must be long enough to allow for the maximum relative movement likely to occur.

In the two constructions described above, the contacts have been normally open and have completed a circuit at the predetermined elevated temperatures, although of course, they could be adjusted to be normally closed and open with a predetermined fall in temperature. Such detectors are appropriate for fire warning devices or for control of refrigerating plants, but for thermostatic control where heating means are to be switched off at the elevated temperature it is more appropriate to have normally-closed contacts at the low end of the temperature range.

A construction having normally-closed contacts is shown in Fig. 5, from which it will be seen that the struts 60, 61, which are of similar form to those shown in Fig. 1, are in this case flexed inwardly at their centre so that the contacts 62, 63 are normally closed. The struts 60, 61 are slotted at one end to fit over a spigot 64 to which the struts 60, 61 are welded, the spigot 64 being secured to the end cap 65 of the barrel 66. At the other end the struts 60, 61 are slotted to fit over the rod of an adjustable carrier 67, the spider portion 68 of which is prevented from rotation by engagement with grooves 66a punched in the barrel 66. The rod of the carrier 67 is provided at one end with a screw-thread 67a, which engages with the internal screw thread on an adjusting member 69. This latter member is also threaded externally to engage with a screw thread formed on the inner surface of a closure plug 70 secured in the end of the barrel 66. The pitch of the respective threads of the adjusting member 69 are slightly different so that the degree of compression applied to the struts 60, 61 can be varied by rotation of the member 69. The contacts 62, 63 are carried on cantilever springs 71, 72 which are reinforced by springs 73, 74, all the springs being secured to an insulating block 75, which is mounted on the carrier 67, and being pre-set so that they tend to move apart. Two insulated wires 76 are connected to the springs 71, 72 and are brought out through the plug 70. For a short distance thereafter they are spliced together with heat-resisting twine 77. The contacts 62, 63 are insulated from the struts 60, 61 by ceramic member 78, 79. For heat insulation of the strut assembly a mica sleeve 86 is provided. It may also be desirable to provide mica discs at one or both ends for the same purpose.

It will be readily apparent that the differential expansion which occurs between the barrel 66 and struts 60, 61 when the temperature increases causes the struts 60, 61 to tend to straighten under the action of the springs 71—74, whereby at a predetermined temperature the contacts 62, 63 are separated.

Fig. 6 shows how the barrel and adjusting member arrangement of the Fig. 5 construction can be used with a strut and contact assembly similar to that shown in Fig. 1 so that adjustment is effected from the base of the detector. Similar parts are similarly referenced to the corresponding parts in those two figures. In this construction, as in Fig. 1 the member 16 can move away from the end plug if the temperature to which the detector is subjected substantially exceeds its operating temperature.

In all the constructions shown the strut assembly is initially under compression, the compression being reduced as the barrel expands. In the case of the Fig. 5 construction, the struts 60, 61 are eventually put in tension and may be damaged by substantial overshoot of the operating temperature. It will be readily appreciated that with suitable modification of the detectors shown these may be arranged to be initially under tension instead of compression, the tension increasing with rising temperature. Thus in the constructions shown in Figs. 1, 3 and 6, the springs would be mounted on the inside of the struts and be pre-set to urge the struts apart thereby placing them under tension. Expansion of the barrel would then apply increasing tension to the struts forcing them together against the action of the springs to close the contacts. Similarly, in the construction of Fig. 5 the springs could be mounted on the outside of the struts and increasing tension would then force them apart.

Figure 7 shows a modified form of the Fig. 5 construction in which similar parts to those in the earlier figures are similarly referenced. Instead of the contacts 62', 63' being mounted on cantilever springs positioned between the struts 60', 61', bow springs 80, 81 are used which are spot welded at their centres to the struts 60', 61' respectively, the ends of the bow springs 80, 81 engaging the inner surface of the barrel 66' and being dished to conform to its curvature. A layer of insulating material 82, 83 of, for example, glass tape is wound around the abutting portions of the struts 60', 61' and bow springs 80, 81 and the contacts 62', 63' are secured around the insulating layers 82, 83 respectively. Connections to the contacts 62', 63' are made by wires 84, 85. In this construction expansion of the barrel 66 applies tension to the struts 60', 61' and moves the contacts 62', 63' apart against the resistance of the bow springs 80, 81. In this construction the ends of the struts 60', 61' which are secured to the spigot 64' may be free to move towards the end cap 65' to accommodate contraction of the barrel at temperatures below that at which the contacts are closed.

A similar arrangement to that shown in Fig. 7 can be used with struts of the kind shown in Fig. 6, by having bow or other springs interposed between the struts to force them apart. The struts will then be pulled together when increasing tension occurs due to expansion of the barrel.

It will be appreciated that other methods of forming a low expansion strut may be used, for example such a strut could be formed from a thin strip of suitable material to which thicker strips of the same material are secured at intervals to form rigid portions, the portion or portions between the thicker strips forming the flexible portions of the strut. The form of the barrel and associated base may be varied greatly and may comprise, for example, known forms of base and barrel. Moreover, the strut assemblies shown in the various constructions may readily be interchanged with the base and barrels of the respective constructions with suitable modifications. Again, as indicated by the second construction it is readily possible to change the position relative to the base of the end of the strut assembly which is free to slide.

Whilst the constructions shown utilise a pair of struts and associated moving contacts, it will be understood that detectors may be made using only a single strut in which case the associated contact may co-operate with a fixed contact, or instead of electrical contacts a mechanical operation may be effected by movement of the strut or struts.

It will be understood that the Figure 7 construction and other constructions can be varied by providing bow springs similar to those shown in Figure 7, but in contact with the struts throughout substantially the whole of their length. The springs will either tend to increase the flexure of the struts or reduce it depending upon whether the struts are tension or compression operated.

What we claim is:

1. A thermal detector comprising in combination an elongated metallic member, said elongated member having a substantial coefficient of thermal expansion over a predetermined temperature range, a second elongated metallic member comprising two relatively rigid portions united by a short flexible portion and having its ends fixed relative to said first member at two spaced points along the length of said second member, said second member being flexed at low temperatures in said range and being composed of a material having a very low coefficient of thermal expansion over said temperature range, and a resilient member freely engaging said second member and adapted to urge it into a straightened condition as differential expansion occurs between the two elongated members when the temperature rises, said free engagement of said resilient member with said second member permitting free differential thermal expansion between said resilient member and said second member.

2. A thermal detector comprising in combination a supporting base for said detector, a tubular metallic member, said tubular member being fixed at one end to said base and being composed of a material having a substantial coefficient of thermal expansion over a predetermined temperature range, two elongated metallic strips secured together at one end to said base and secured together at the other end to that end of the tubular member which is remote from said base, each strip comprising two relatively rigid strut portions united by a short flexible portion and the distance between the securing points on the base and the end of the tubular member respectively being less at temperatures below a predetermined elevated temperature within said range than the length of said strips whereby said strips are flexed apart from one another in opposite directions, said strips being composed of a material having a coefficient of thermal expansion over said temperature range which is negligible by comparison with the coeffcent of thermal expansion of said tubular member, means for adjusting the relative position of the adjacent ends of said tubular member and said strips to vary the separation between said strips, two cantilever springs each having their unsupported end bearing upon one of said strips respectively adjacent to its short flexible portion, and two electric contacts each mounted adjacent the unsupported end of one of said springs, said springs being adapted to urge said contacts towards one another as differential expansion between said tubular member and said strips permits unflexing of the latter.

3. A thermal detector according to claim 2 in which said temperature range is from room temperature to 300° C.

4. A thermal detector according to claim 2 in which said temperature range is from room temperature to 450° C.

5. A thermal detector comprising a first member having a substantial coefficient of thermal expansion over a predetermined temperature range, a second member having negligible coefficient of thermal expansion over said range, said second member comprising two relatively rigid strut portions united by a short flexible portion and with the other end of each strut portion fixed relative to said first member, said second member being flexed at least at temperatures below a predetermined elevated temperature in said range, and resilient means urging said second member into a less flexed position, whereby at a predetermined elevated temperature in said range the differential expansion between said first and second members enables said second member to attain said position.

6. A thermal detector comprising in combination a supporting base for said detector, a tubular metallic member, said tubular member being fixed at one end to said base and being composed of a material having a substantial coefficient of thermal expansion over a predetermined temperature range, an adjustable member fixed in that end of said tubular member which is remote from said base and movable towards and away from said base, two elongated metallic strips each secured at one end to said base and at the other end to said adjustable member and each comprising two relatively rigid strut portions united by a short flexible portion, said adjustable member being movable to a position at which said strips are flexed apart at their flexible portions when said detector is at temperatures below a predetermined elevated temperature within said range, said strips being composed of a material having a coefficient of thermal expansion over said temperature range which is negligible by comparison with the coefficient of thermal expansion of said tubular member, two cantilever springs each having their unsupported end bearing upon one of said strips respectively, two electric contacts each mounted adjacent the unsupported end of one of said springs, two electric terminals insulatingly mounted in said base, and electrical connections between each of said contacts and one of said terminals respectively.

7. A thermal detector comprising in combination a tubular metallic member, said tubular member being closed at each end and being composed of a material having a substantial coefficient of thermal expansion over a predetermined temperature range, an adjustable member fixed in one end of said tubular member and movable relative to said end of the tubular member, two elongated metallic strips each secured at one end to that end of said tubular member which is remote from said adjustable member and each secured at the other end to said adjustable member, each elongated strip comprising two relatively rigid strut portions united by a short flexible portion, said adjustable member being movable to vary the flexure of said strips, said strips being composed of a material having a coefficient of thermal expansion over said temperature range which is negligible by comparison with the coefficient of thermal expansion of said tubular member, two cantilever springs each having their unsupported end bearing upon one of said strips respectively, two electric contacts each mounted on one of said springs adjacent the unsupported end of the respective spring, and electrical connections to each of said contacts.

8. A thermal detector comprising in combination a tubular metallic member, said tubular member being closed at each end and being composed of a material having a substantial coefficient of thermal expansion over a predetermined temperature range, two elongated metallic strips extending through said tubular member and fixed at each of their ends relative to said tubular member, each strip comprising two relatively rigid strut portions united by a short flexible portion, said strips being composed of a material having a coefficient of thermal expansion over said temperature range which is negligible by comparison with the coefficient of thermal expansion of said tubular member, means for adjusting the relative position of the adjacent ends of said tubular member and said strips, two cantilever springs each having their unsupported end bearing upon one of said strips respectively adjacent to its short flexible portion, and two electric contacts each mounted adjacent the unsupported end of one of said springs.

9. A thermal detector comprising a first member having a substantial coefficient of thermal expansion over a predetermined temperature range, a second member having a negligible coefficient of thermal expansion over said range, said second member comprising two elongated metallic strips each consisting of two relatively rigid strut portions united by a short flexible portion and with the free end of each strut portion fixed relative to said first member, said two elongated strips being flexed at least at temperatures below a predetermined elevated temperature in said range, and two resilient means, each resilient means urging one of said strips into a less flexed position, whereby at a predetermined elevated temperature in said range the differential expansion between said first and second members enables each of said elongated strips to attain said position.

10. A thermal detector comprising in combination a first metallic member, said first member having a substantial coefficient of thermal expansion over a predetermined temperature range, a second metallic member, said second member having a smaller coefficient of thermal expansion over said range, said second member being elongated and having an intermediate portion of greater flexibility than the flexibility of the remainder of said second member, an abutment member fixed relative to said first member, abutment engaging means secured to one end of said second member and adapted to engage said abutment member to limit in one direction only movements of said second member relative to said first member which are caused by temperature changes, the other end of said second member being fixed relative to said first member, and resilient means freely engaging said second member along an intermediate portion of the latter to vary the flexure of said second member when the length of said first member varies with temperature, said free engagement of said resilient means with said second member permitting differential thermal expansion between said resilient means and said second member.

References Cited in the file of this patent

UNITED STATES PATENTS

| | | |
|---|---|---|
| 2,185,433 | Fenn et al. | Jan. 2, 1940 |
| 2,619,567 | Walbridge | Nov. 25, 1952 |
| 2,627,565 | Smith | Feb. 3, 1953 |